United States Patent [19]

Bohachevsky

[11] 4,277,305

[45] Jul. 7, 1981

[54] BEAM HEATED LINEAR THETA-PINCH DEVICE FOR PRODUCING HOT PLASMAS

[75] Inventor: Ihor O. Bohachevsky, Los Alamos, N. Mex.

[73] Assignee: The United States of America as represented by the United States Department of Energy, Washington, D.C.

[21] Appl. No.: 960,410

[22] Filed: Nov. 13, 1978

[51] Int. Cl.$^3$ .............................................. G21B 1/00
[52] U.S. Cl. ......................................... 176/1; 176/7; 176/9
[58] Field of Search ............................. 176/1, 3, 7, 9; 315/111.2

[56] References Cited

U.S. PATENT DOCUMENTS

| 3,624,239 | 11/1971 | Fraas | 176/9 |
| 3,652,393 | 3/1972 | Kaiser et al. | 176/1 |
| 3,723,703 | 3/1973 | Ehlers et al. | 176/1 |
| 3,733,248 | 5/1973 | Hendel et al. | 176/1 |
| 3,755,073 | 8/1973 | Haught et al. | 176/1 |
| 3,808,432 | 4/1974 | Askin | 176/9 |

FOREIGN PATENT DOCUMENTS 1482526  8/1977  United Kingdom ........................ 176/1

OTHER PUBLICATIONS

LA-5366 PR, 1973, pp. 58–68.
Physics Today, 3/75, pp. 17, 20.
Physical Review, vol. 174, No. 1, 10/68, pp. 212–220.
ERDA-76/108, Jul. 28–Aug. 1, 1975, pp. 335–349, 360, 390–411.
Physical Review Letters 9/75, pp. 848–851, Clauser.
Applied Physics Letters, vol. 26, No. 9, 5/1/75, pp. 496–499, Nunnally et al.

Primary Examiner—Harvey E. Behrend
Attorney, Agent, or Firm—William W. Cochran, II; Paul D. Gaetjens; James E. Denny

[57] ABSTRACT

A device for producing hot plasmas comprising a single turn theta-pinch coil, a fast discharge capacitor bank connected to the coil, a fuel element disposed along the center axis of the coil, a predetermined gas disposed within the theta-pinch coil, and a high power photon, electron or ion beam generator concentrically aligned to the theta-pinch coil. Discharge of the capacitor bank generates a cylindrical plasma sheath within the theta-pinch coil which heats the outer layer of the fuel element to form a fuel element plasma layer. The beam deposits energy in either the cylindrical plasma sheath or the fuel element plasma layer to assist the implosion of the fuel element to produce a hot plasma.

5 Claims, 3 Drawing Figures

BEAM HEATED LINEAR THETA-PINCH DEVICE FOR PRODUCING HOT PLASMAS

BACKGROUND OF THE INVENTION

The present invention pertains generally to plasmas and more specifically to devices for generating thermonuclear neutrons.

Prior art methods for generating hot plasmas have been limited to inertially and magnetically confined systems. A typical example of an inertially confined system is the implosion of fuel microcapsules by impingent high power laser or electron beams. Typical examples of magnetically confined systems comprise theta-pinch devices, Z-pinch devices, various toroidal configurations such as stellarators, syllacs tokomacs, and toroidal Z-pinch devices, which form a magnetic bottle to confine a hot plasma for a predetermined period at sufficiently high temperatures and pressures to produce thermonuclear neutrons.

Both the inertially confined systems and the magnetically confined systems have various disadvantages and limitations. In both types of systems it is difficult and expensive to bring to bear sufficient energy on the hot plasma to insure significant thermonuclear burn. End losses in linear theta-pinch devices and various instabilities defeating confinement in other magnetic confinement systems due to rapid growth relative to containment times, also result in limited burn of the thermonuclear plasma. Damage to inertial confinement targets prior to implosion due to deposition of beam energy directly on the fuel element also limits neutron yield. This has been alleviated somewhat by pulse shaping and limiting the duration of the beam pulse. However, these measures impose extreme design limitations on the beam pulse generator which typically reduce efficiency. Moreover, the necessity of beam focusing to fuel microcapsule diameters requires expensive and easily damaged optics. Additionally, absorption characteristics of fuel microcapsule for impingent laser beams does not provide a good impedance match to insure maximum deposition of energy. Although magnetic confinement systems protect the containment vessel by magnetic energy fields and provide a means for recovering magnetic energy during fuel expansion, such systems are not inherent to inertially confined systems and must be added separately.

SUMMARY OF THE INVENTION

The present invention overcomes the disadvantages and limitations of the prior art by providing a beam heated linear theta-pinch device for producing hot plasmas. According to the present invention, both magnetic and beam energy are utilized to supplement each other to produce a hot plasma. The implosive nature and rapid burn characteristics of the present invention eliminate end loss and plasma instability problems associated with magnetically contained systems. Since the beam energy is not directed at the fuel microcapsule but rather at a surrounding plasma, problems of fuel target damage, beam focusing, pulse shape and duration, and energy absorption properties are alleviated. Moreover, the magnetic field of the linear theta-pinch device of the present invention protects the cylindrical walls from the microexplosion and allows magnetic energy to be recovered during fuel expansion as well as providing a simple cylindrical geometry minimizing construction and operational difficulties.

It is therefore an object of the present invention to provide a device for generating a hot plasma.

It is also an object of the present invention to provide a device for generating thermonuclear neutrons.

Another object of the present invention is to provide a device for generating hot plasmas which is simple in operation and easy to implement.

Another object of the present invention is to provide a device for producing hot plasmas which is inexpensive to implement.

Another object of the present invention is to provide a device for generating hot plasmas which overcomes the disadvantages and limitations of inertial confinement systems.

Another object of the present invention is to provide a device for producing hot plasmas which overcomes the disadvantages and limitations of inertial confinement systems.

Other objects and further scope of applicability of the present invention will become apparent from the detailed description given hereinafter. The detailed description, indicating the preferred embodiments of the invention is given only by way of illustration since various changes and modifications within the spirit and scope of the invention will become apparent to those skilled in the art from this detailed description.

The foregoing Abstract of the Disclosure is for the purpose of providing a nonlegal brief statement to serve as a searching and scanning tool for scientists, engineers, and researchers and is not intended to limit the scope of the invention as disclosed herein, nor is it intended to be used in interpreting, or in any way limiting, the scope or fair meaning of the appended claims.

DETAILED DESCRIPTION OF THE PREFERRED EMBODIMENTS OF THE INVENTION

Figure 1:
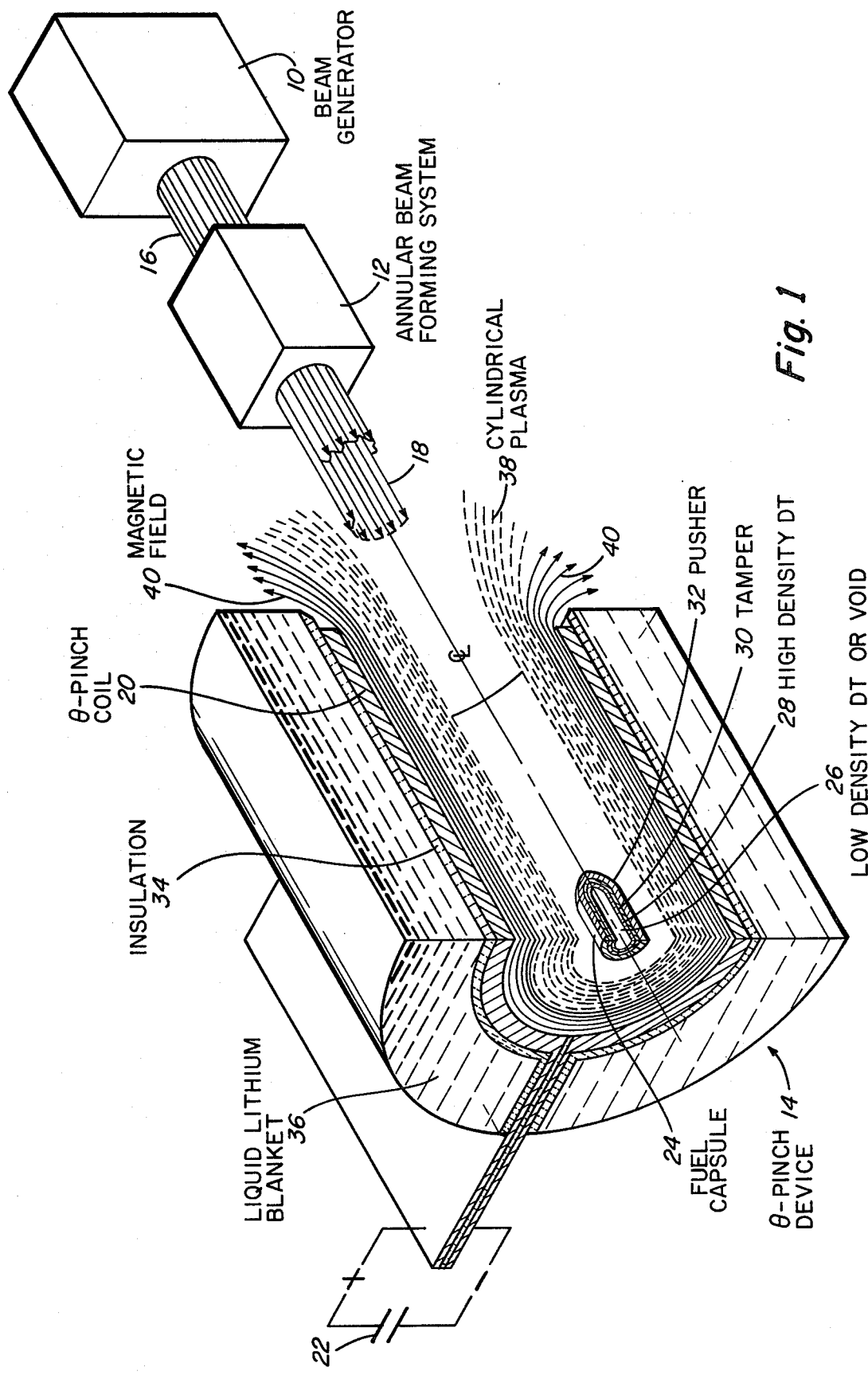
FIG. 1 is a perspective schematic diagram of the device of the preferred embodiments of the invention.

FIG. 1 discloses a perspective view of the device comprising the preferred embodiments of the invention. As shown, the device comprises a beam generator 10, an annular beam forming system 12, and a linear theta-pinch device 14. Beam generator 10 comprises a high power laser, ion, or electron beam generator. Annular beam forming system 12 comprises standard optical means for generating an annular beam from a solid laser beam or standard propagation devices for generating annular beams from solid ion and electron beams generated by beam generator 10. Therefore, the output beam 18 from annular beam forming means 12 constitutes either a laser, ion, or electron annular beam.

The annular beam 18 is propagated into the theta-pinch device 14. The theta-pinch device 14 comprises a single turn theta-pinch coil 20 having an approximately 5 cm radius and having a length of 50–100 cm. The theta-pinch coil is attached to a fast capacitor bank 22 which is capable of generating a magnetic field of nearly 100 KGauss. The theta-pinch coil is filled with an ionized working fluid at a pressure of 1–10 mm Hg.

A fuel capsule 24 is disposed along the axis of the theta-pinch coil 20 at the center of the axial length of the device as shown in the cutaway view of the theta-pinch device 14 of FIG. 1. The fuel capsule comprises a thermonuclear fuel such as DT as a solid, a hollow shell, or high pressure gas. As shown in FIG. 1, a low density or void section 26 is surrounded by high density DT 28 which is further surrounded by a tamper 30 which normally comprises a high-Z material, which is further surrounded by a pusher 32 which comprises a low-Z material. Surrounding the outside of theta-pinch coil 20 is an insulation layer 34 which is further surrounded with a liquid lithium blanket 36.

In operation, the theta-pinch device 14 operates in a conventional manner. Discharge of the fast discharge capacitor bank 22 generates a converging theta-pinch shock which establishes an imploding dense hot plasma sheath 38 from the ionized working fluid. The dense hot plasma sheath 38 causes pusher 32 of fuel capsule 24 to evaporate amd generate a fuel element plasma layer. Subsequently, according to one embodiment of the invention, annular beam 18 is directed at the fuel element plasma layer and adds sufficient energy to this plasma layer to cause the tamper 30 and high density fuel 28 to accelerate toward the center of the fuel capsule 24 to implode and generate a hot thermonuclear plasma. Simultaneously, the cylindrical plasma sheath 38 is driven towards the axis of the theta-pinch coil 20 to increase compression of the thermonuclear fuel at the center of the fuel capsule 24. The timing of the beam energy deposition is such that the theta-pinch and beam generated compression waves arrive at the center of the fuel capsule 24 nearly simultaneously.

According to another embodiment of the present invention, annular beam 18 is aligned with cylindrical plasma sheath 38 to dispose energy in the cylindrical plasma sheath. The addition of beam energy to the cylindrical plasma sheath 38 causes the innerpart of the sheath 38 to implode rapidly on fuel capsule 24 with the combined energy of the annular beam 18 and the theta-pinch coil 20.

Figure 2:
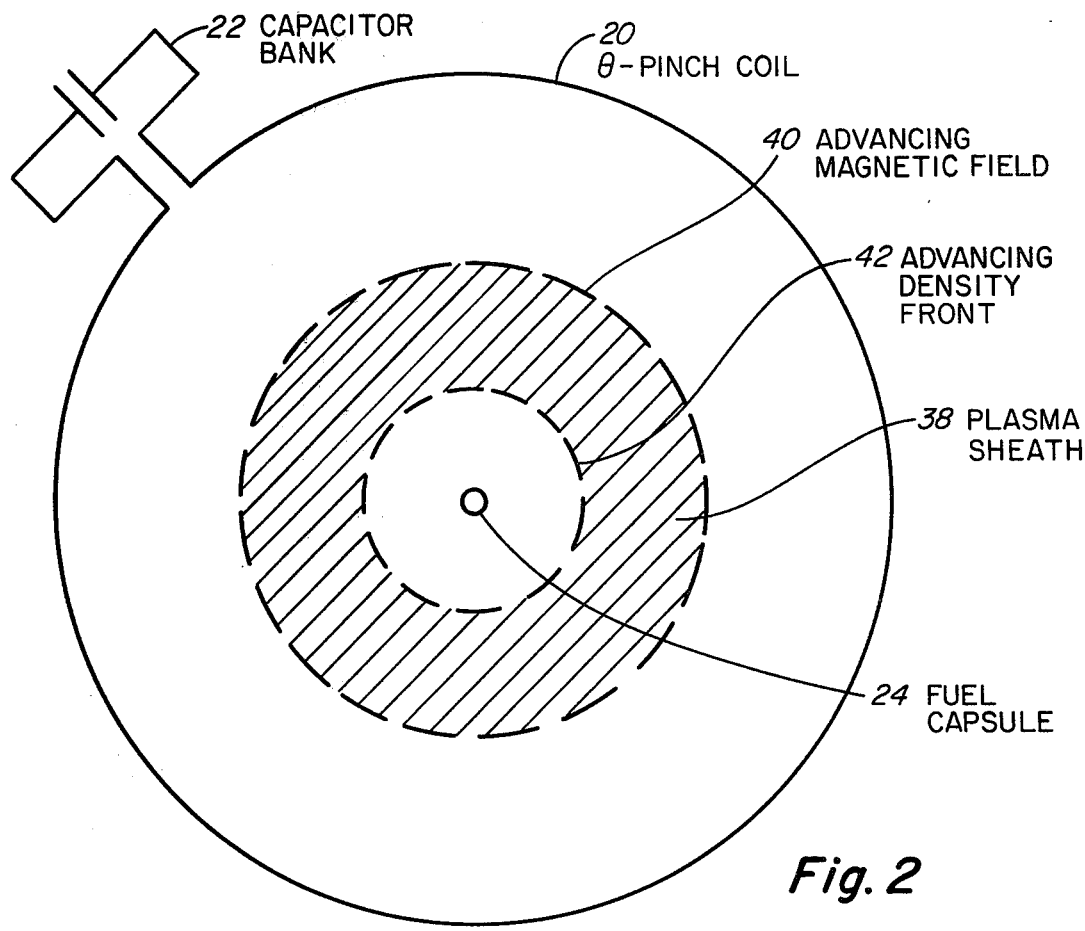
FIG. 2 is a schematic end diagram of the linear theta-pinch device of the present invention.

FIG. 2 is a schematic diagram of an end view of the theta-pinch device 14 of FIG. 1. Capacitor bank 22 discharges energy into cylindrical theta-pinch coil 20 which generates an advancing magnetic field 40. The advancing magnetic field in turn generates a cylindrical plasma sheath 38 having an advancing density front 42 which converges on fuel capsule 24.

Figure 3:
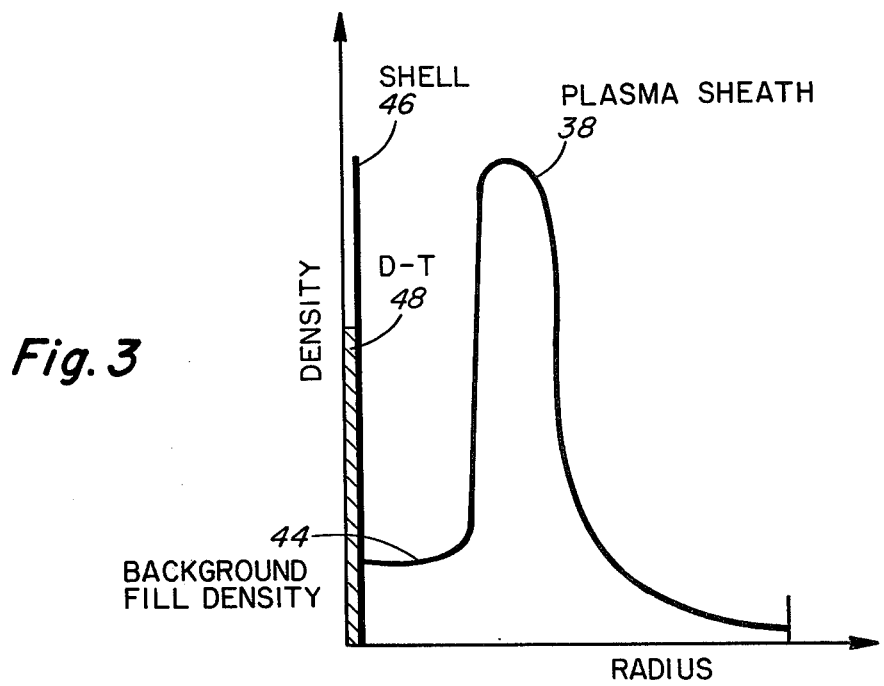
FIG. 3 is a graph of density versus radius of the device as shown in FIG. 2 of the invention.

The relative densities are more clearly shown in the graph of FIG. 3 which is a plot of density within the theta-pinch coil 20 versus radial distance from the center of the theta-pinch coil 20. As shown, the advancing magnetic field 40 generates a high density plasma sheath 38 which travels toward the axis of the theta-pinch coil. As a result, the density outside the advancing magnetic field is somewhat lower than the background fill density 44. The graph of FIG. 3 additionally shows the shell density 46 and density of the thermonuclear DT fuel 48.

According to the operational sequence described above, the major contribution to the implosion energy of the fuel capsule 24 is provided by the laser, electron, or ion beam. The advancing magnetic field 40 generated by capacitor bank 22 and theta-pinch coil 20, however, helps to precompress and accelerate the thermonuclear fuel by evaporation of the pusher 32 in one embodiment, and provides a high density cylindrical plasma sheath 38 which is capable of absorbing beam energy in another embodiment of the invention. In both embodiments, the magnetic field 40 inhibits radial heat conduction to the wall and protects the theta pinch coil 20 from charged ions during fuel burn and improves stability of fuel implosion with an addeded bias field 40.

The working fluid from which the plasma sheath 38 is generated is selected according to the particular embodiment utilized. Use of DT gas to generate plasma sheath 38 has the advantage of providing a non-contaminating material which is capable of thermonuclear burn during the implosion process. However, the absorption characteristics of the DT plasma are less desirable than higher atomic weight gases such as Argon or similar gases. Yet, as disclosed in co-pending application Ser. No. 882,024, entitled "E-Beam Driven Linear Intense Neutron Source", filed Feb. 28, 1978 by Lester E. Thode now abandoned in favor of a continuation-in-part application, Ser. No. 071.603 filed Aug. 31, 1979, deposition of electron beam energy in plasmas having $10^{17}$ particles/cm$^3$ and greater can be accomplished by providing a high voltage, i.e. 10 MeV to 30 MeV, low $\mu/\gamma$ electron beam.

The present invention therefore provides a means for generating hot plasmas in the kilovolt range by utilizing two sources of energy, i.e. magnetic and beam energy, which supplement each other to implode a thermonuclear fuel capsule. This overcomes many of the problems associated with prior art systems. The implosive nature of the present system eliminates end loss problems typically encountered in theta-pinch devices and laser heated solenoids. The possibility of fuel target damage encountered typically in laser fusion targets is eliminated by deposition of beam energy in the cylindrical plasma sheath 38 or fuel element plasma layer. This also aleviates problems associated with beam focusing, pulse shape and duration, and energy absorption properties of the fuel capsule. The magnetic field of the theta-pinch device 14 functions to protect the cylindrical wall from fusion reaction products and allows recovery of magnetic energy during fuel expansion to increase overall efficiency of the device.

Obviously, many modifications and variations of the present invention are possible in light of the above teachings. It is therefore to be understood that within the scope of the appended claims, the invention may be practiced otherwise than as specifically described, and that subject matter disclosed herein shall not be precluded from being later claimed in the present application or a continuation, continuation-in-part, or reissue application.

What is claimed is:

1. A device for generating a hot plasma comprising:
    a cylindrically shaped fuel element concentrically aligned with a predetermined axis;
    a linear theta pinch device concentrically aligned with said predetermined axis;
    a working gas contained within said linear theta pinch device;
    cylindrical plasma sheath means generated by said linear theta pinch device from said working gas for producing a theta pinch compression wave in said fuel element;
    a concentric fuel element plasma layer formed by vaporization and ionization of an outer portion of said fuel element by the application of said cylindrical plasma sheath to said fuel element;
    annular beam means concentrically aligned with said concentric fuel element plasma layer to dispose energy in said concentric fuel element plasma layer sufficient to ablatively drive said fuel element to produce a beam generated compression wave in said fuel element;

whereby said theta pinch compression wave and said beam generated compression wave arrive at the center of said fuel element nearly simultaneously to enhance generation of said hot plasma.

2. The device of claim 1 wherein said annular beam means comprises an annular photon beam.

3. The device of claim 1 wherein said annular means comprises an annular electron beam.

4. The device of claim 1 wherein said annular beam means comprises an annular ion beam.

5. The device of claim 1 wherein said cylindrical plasma sheath comprises a cylindrical sheath of DT plasma.

* * * * *